(12) United States Patent
Shin et al.

(10) Patent No.: US 12,512,562 B2
(45) Date of Patent: Dec. 30, 2025

(54) BATTERY PACK AND DEVICE INCLUDING THE SAME

(71) Applicant: LG ENERGY SOLUTION, LTD., Seoul (KR)

(72) Inventors: Juhwan Shin, Daejeon (KR); Hyoungsuk Lee, Daejeon (KR); Soon Chang Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 753 days.

(21) Appl. No.: 17/769,035

(22) PCT Filed: Jul. 20, 2020

(86) PCT No.: PCT/KR2020/009537
§ 371 (c)(1),
(2) Date: Apr. 14, 2022

(87) PCT Pub. No.: WO2021/107317
PCT Pub. Date: Jun. 3, 2021

(65) Prior Publication Data
US 2024/0030559 A1      Jan. 25, 2024

(30) Foreign Application Priority Data
Nov. 26, 2019    (KR) ........................ 10-2019-0153521

(51) Int. Cl.
*H01M 50/507* (2021.01)
*B60L 50/60* (2019.01)
(Continued)

(52) U.S. Cl.
CPC ........... *H01M 50/507* (2021.01); *B60L 50/66* (2019.02); *H01M 10/425* (2013.01);
(Continued)

(58) Field of Classification Search
CPC ....... H01M 50/211; H01M 50/50–503; H01M 50/507; H01M 50/572–574;
(Continued)

(56) References Cited

U.S. PATENT DOCUMENTS 3,457,535 A * 7/1969 Poehlman, Jr. ........ H01H 85/32
                                                              337/241
4,661,807 A * 4/1987 Panaro ................... G01R 31/50
                                                              337/241
(Continued)

FOREIGN PATENT DOCUMENTS

CN        201988184 U      8/2011
CN        207572429 U      7/2018
(Continued)

OTHER PUBLICATIONS

Machine translation of Li, CN 207572429. Originally published Jul. 3, 2018. (Year: 2018).*
(Continued)

*Primary Examiner* — Jonathan Crepeau
*Assistant Examiner* — Jacob Buchanan
(74) *Attorney, Agent, or Firm* — Birch, Stewart, Kolasch & Birch, LLP (57) ABSTRACT

The battery pack includes a first battery module and a second battery module each including a plurality of battery cells; a first bus bar extended from the first battery module and a second bus bar extended from the second battery module; a fuse for connecting the first bus bar and the second bus bar; and a fixing member having heat resistance in which at least a part is located at the lower end part of the fuse.

13 Claims, 8 Drawing Sheets

(51) Int. Cl.
*H01M 10/42* (2006.01)
*H01M 50/204* (2021.01)
*H01M 50/211* (2021.01)
*H01M 50/502* (2021.01)
*H01M 50/583* (2021.01)

(52) U.S. Cl.
CPC ....... *H01M 50/204* (2021.01); *H01M 50/211* (2021.01); *H01M 50/502* (2021.01); *H01M 50/583* (2021.01); *H01M 2220/20* (2013.01)

(58) Field of Classification Search
CPC .... H01M 50/58; H01M 10/42; H01M 10/425; B60L 50/60; B60L 50/64–66
See application file for complete search history.

(56) References Cited

U.S. PATENT DOCUMENTS

| | | | |
|---|---|---|---|
| 2004/0007375 A1 | 1/2004 | Higuchi et al. | |
| 2007/0120526 A1 | 5/2007 | Kumeuchi et al. | |
| 2008/0242150 A1* | 10/2008 | Chikamatsu | H01H 85/0208 337/237 |
| 2011/0111649 A1* | 5/2011 | Garascia | H01M 10/4257 337/414 |
| 2012/0315507 A1* | 12/2012 | Kim | H01M 10/425 429/7 |
| 2013/0052515 A1* | 2/2013 | Park | H01M 50/209 429/159 |
| 2014/0220396 A1* | 8/2014 | Lee | H01M 10/425 429/61 |
| 2017/0187015 A1 | 6/2017 | Miyamoto et al. | |
| 2018/0174791 A1* | 6/2018 | Kawai | H01H 85/175 |
| 2018/0331345 A1 | 11/2018 | Um et al. | |
| 2020/0067062 A1 | 2/2020 | Lim et al. | |
| 2022/0392727 A1* | 12/2022 | Shin | H01M 50/583 |

FOREIGN PATENT DOCUMENTS

| | | | |
|---|---|---|---|
| CN | 108878898 A | 11/2018 | |
| CN | 101017887 A | 10/2025 | |
| JP | 2002-203528 A | 7/2002 | |
| JP | 2003-45383 A | 2/2003 | |
| JP | 2004-47178 A | 2/2004 | |
| JP | 2007-173223 A | 7/2007 | |
| JP | 2015-5473 A | 1/2015 | |
| JP | 2016-139534 A | 8/2016 | |
| JP | 2017-4699 A | 1/2017 | |
| JP | 2014-229384 A | 10/2025 | |
| KR | 10-2013-0007324 A | 1/2013 | |
| KR | 10-2014-0100098 A | 8/2014 | |
| KR | 10-2015-0115402 A | 10/2015 | |
| KR | 10-2016-0082075 A | 7/2016 | |
| KR | 10-1749721 B1 | 6/2017 | |
| WO | WO-2021230497 A1 * | 11/2021 | ......... H01H 85/2045 |

OTHER PUBLICATIONS

Extended European Search Report for European Application No. 20894260.7 dated Feb. 8, 2023.
International Search Report (PCT/ISA/210) issued in PCT/KR2020/009537 mailed on Oct. 29, 2020.

* cited by examiner

BATTERY PACK AND DEVICE INCLUDING THE SAME

TECHNICAL FIELD

Cross Citation with Related Application(S)

This application claims the benefit of Korean Patent Application No. 10-2019-0153521 filed on Nov. 26, 2019 with the Korean Intellectual Property Office, the disclosure of which is incorporated herein by reference in its entirety.

The present disclosure relates to a battery pack and a device including the same, and more particularly to a battery pack including a fuse, and a device including the same.

BACKGROUND ART

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and accommodates the electrode assembly together with an electrolyte solution.

Generally, the lithium secondary battery may be classified based on the shape of the exterior material into a prismatic-type secondary battery in which the electrode assembly is mounted in a metal can, and a pouch-type secondary battery in which the electrode assembly is mounted in a pouch of an aluminum laminate sheet.

In the case of a secondary battery used for small-sized devices, two to three battery cells are arranged, but in the case of a secondary battery used for a medium to large-sized devices such as an automobile, a battery module in which a large number of battery cells are electrically connected is used. In such a battery module, a plurality of battery cells is connected to each other in series or parallel to form a cell stack, thereby improving capacity and output. In addition, a plurality of battery modules can be mounted together with various control and protection systems such as a battery management system (BMS) and a cooling system to form a battery pack.

The battery pack is formed in a structure in which a large number of battery modules are combined. Thus, when overvoltage, overcurrent or overheating occur in some battery modules, the safety and operating efficiency of the battery pack become a big problem, and thus, a means for detecting and controlling them is required.

Therefore, the battery pack includes a fuse that is blown out to interrupt the flow of currents when an overcurrent flows due to a short circuit of a wire or the like. However, when an abnormal condition such as overvoltage, overcurrent or overheating occurs inside the battery pack, problems may occur in which the fuse box for wrapping the fuse may melt and comes into contact with the internal structure. In this case, the fuse does not cut off the current and an additional event occurs inside the battery pack, and thus, the safety of the battery pack is greatly reduced.

DETAILED DESCRIPTION OF THE INVENTION

Technical Problem

Embodiments of the present disclosure have been designed to solve the above-mentioned problems of the previously proposed methods, and an object of the present disclosure is to provide a battery pack with improved safety by disposing an additional fixing device for the fuse installed inside the battery pack, and a device including the same.

However, the problem to be solved by embodiments of the present disclosure is not limited to the above-described problems, and can be variously expanded within the scope of the technical idea included in the present disclosure.

Technical Solution

A battery pack according to one embodiment of the present disclosure includes: a first battery module and a second battery module, each battery module including a plurality of battery cells; a first bus bar extended from the first battery module and a second bus bar extended from the second battery module; a fuse for connecting the first bus bar and the second bus bar; and a fixing member having heat resistance in which at least a part of the fixing member is located at a lower end part of the fuse.

The fuse may include a non-conductive part having an electrical insulation, and the fixing member may be located under the non-conductive part.

A lowermost part of the first battery module may be located higher than an uppermost part of the second battery module.

The first bus bar may be configured so as to go upward as it goes toward the first battery module, and the second bus bar may be configured so as to go downward as it goes toward the second battery module.

The first battery module and the second battery module may form a layered structure.

The fixing member may include at least one of a ceramic material, fiberglass, and plastic material.

The battery pack may include a fuse box for accommodating the fuse therein, wherein the fuse box may include an outer peripheral frame that wraps the fuse and has one open side, and a cover that covers the one opened side of the outer peripheral frame.

The outer peripheral frame may include a fixing member frame for wrapping an outer peripheral surface of the fixing member.

The fixing member frame may be integrally formed with the outer peripheral frame.

The fuse box may include an injection material.

The fixing member may include a clamp part for wrapping at least a part of an outer peripheral surface of the fuse, and the clamp part may support the lower end part of the fuse.

The clamp part may support the lower end part of the fuse while wrapping the lower end part, one side part and an upper end part of the fuse.

The fuse may have a cylindrical shape, and the clamp part has a circular clamp shape.

Advantageous Effects

According to the embodiments of the present disclosure, even if an abnormal condition occurs inside the battery pack, the fuse can be fixed by the fixing member supporting the lower end part thereof to prevent the fuse from coming into contact with other structures.

In addition, since the fixing member can be applied to a fuse product in which only a part has an insulating property, cost reduction can be expected.

DETAILED DESCRIPTION OF THE EMBODIMENTS

Hereinafter, various embodiments of the present disclosure will be described in detail with reference to the accompanying figures so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present.

In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 1:
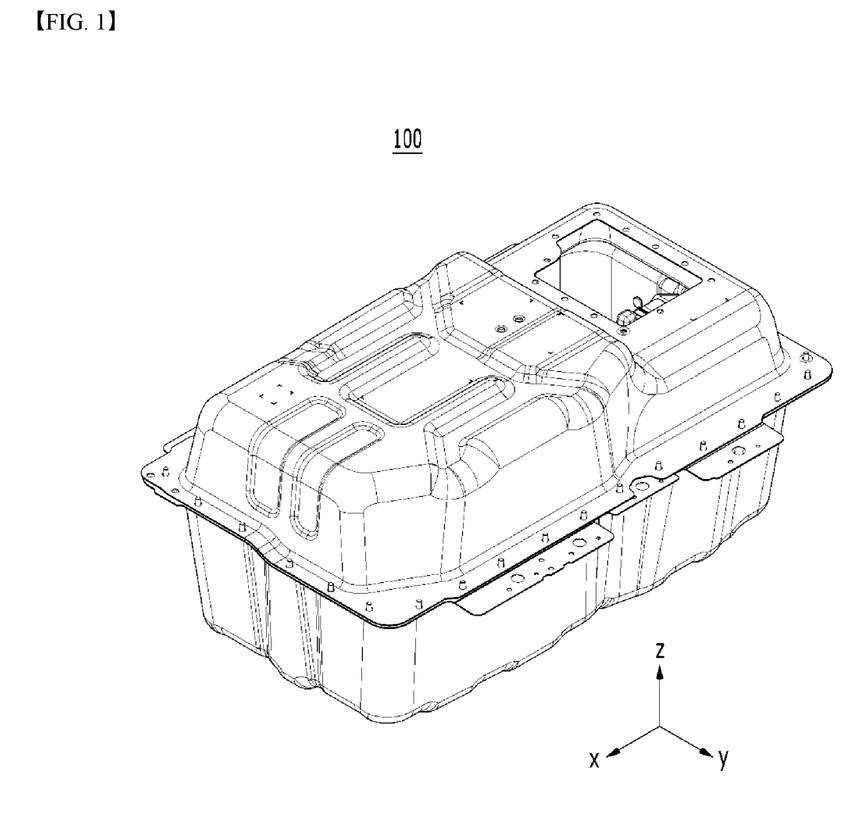
FIG. 1 is a perspective view of a battery pack according to one embodiment of the present disclosure.
Figure 2:
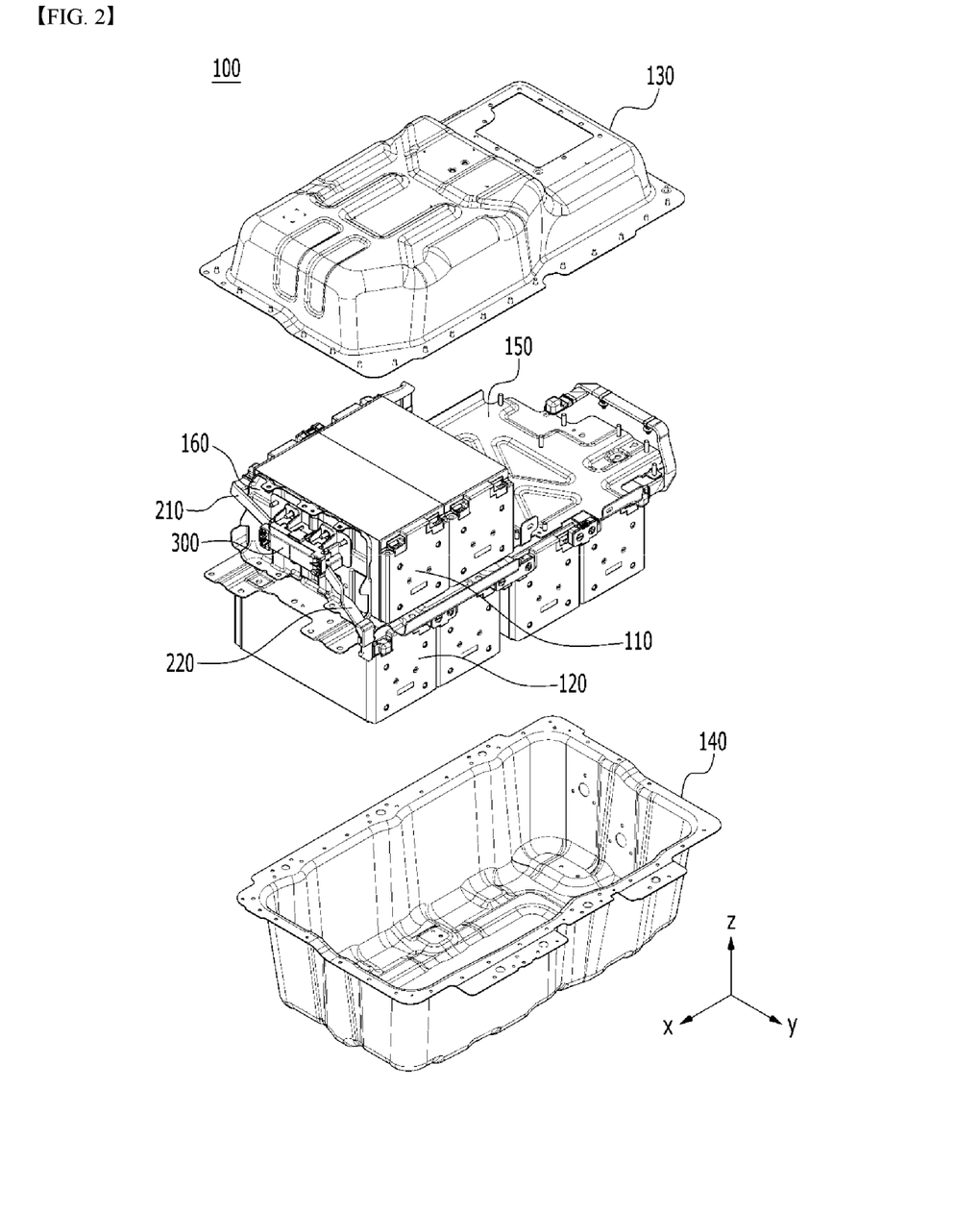
FIG. 2 is an exploded perspective view of the battery pack of FIG. 1.

FIG. 1 is a perspective view of a battery pack 100 according to one embodiment of the present disclosure, and FIG. 2 is an exploded perspective view of the battery pack 100 of FIG. 1.

Referring to FIGS. 1 and 2, the battery pack 100 according to the present embodiment includes a first battery module 110 and a second battery module 120 each including a plurality of battery cells; a first bus bar 210 extended from the first battery module 110 and a second bus bar 220 extended from the second battery module 120; a fuse 300 for connecting the first bus bar 210 and the second bus bar 220; and a fixing member having heat resistance in which at least a part is located at the lower end part of the fuse 300. The fixing member will be described in detail later in FIG. 4.

The lowermost part of the first battery module 110 may be located higher than the uppermost part of the second battery module 120. The first battery module 110 and the second battery module 120 may form a layered structure, the first battery module 110 may be located at the upper layer, and the second battery module may be located at the lower layer.

Meanwhile, the battery pack 100 may further include a battery module in addition to the first battery module 110 and the second battery module 120. For example, as shown in FIG. 2, two battery modules including the first battery module 110 may be located in the upper layer, and four battery modules including the second battery module 120 may be located in the lower layer. By disposing a large number of battery modules in the layered structure in this way, the battery modules in the battery pack 100 may be more compactly disposed.

Meanwhile, the battery module located in the upper layer and the battery module located in the lower layer may be distinguished by a layered structure with a horizontal plate 150 being interposed therebetween.

Meanwhile, the battery pack 100 may include an upper case 130 and a lower case 140 that accommodate battery modules including the first battery module 110 and the second battery module 120 therein. The upper case 130 and the lower case 140 may be fastened by bolt-nut connection.

Figure 3:
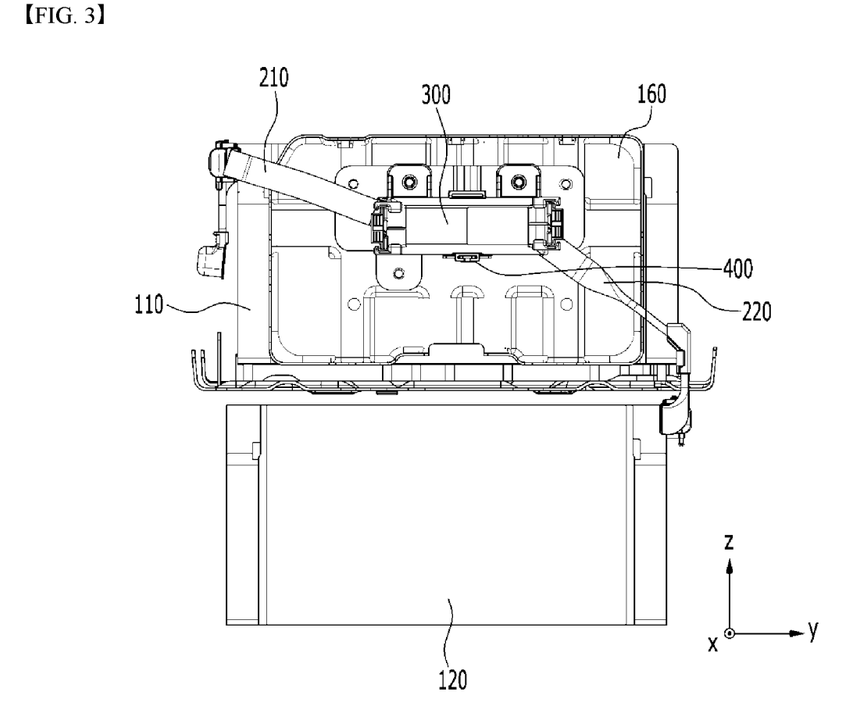
FIG. 3 is a front view of the battery pack of FIG. 2 as viewed from a direction opposite to the x-axis.

FIG. 3 is a front view of the battery pack of FIG. 2 as viewed from a direction opposite to the x-axis. More specifically, FIG. 3 is a front view showing a state in which the upper case 130 and the lower case 140 are moved from the battery pack 100 of FIG. 2.

Referring to FIG. 3 together with FIG. 2, a fuse 300 connects a first bus bar 210 extended from the first battery module 110 and a second bus bar 220 extended from the second battery module 120. When an abnormal condition such as an overcurrent occurs inside the battery pack, the fuse 300 can cut off the current to interrupt the current between the first battery module 110 and the second battery module 120.

A side plate 160 may be located on one side of the first battery module 110, and a fuse 300 may be fixed to the side plate 160.

Figure 4:
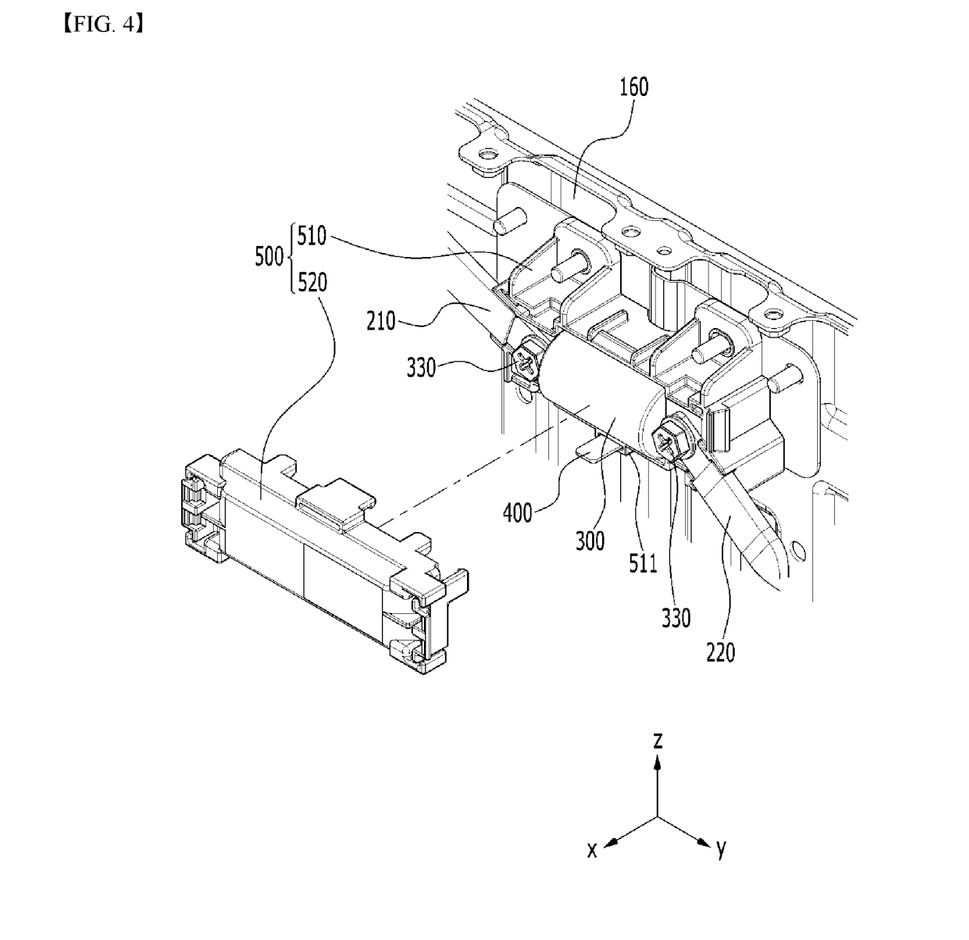
FIG. 4 is an enlarged perspective view of the fuse of FIG. 3.

FIG. 4 is an enlarged perspective view of the fuse 300 of FIG. 3. More specifically, FIG. 4 shows a state in which the cover 520 of the fuse box 500 is disassembled.

Referring to FIG. 4 together with FIG. 3, the battery pack according to the present embodiment includes a fixing member 400 having heat resistance in which at least a part is located at the lower end part of the fuse 300.

Further, the battery pack according to the present embodiment may include a fuse box 500 that accommodates the fuse 300 therein, wherein the fuse box 500 may include an outer peripheral frame 510 that warps the fuse 300 and has one open side (in the x-axis direction in FIG. 4), and a cover 520 that covers the one open side of the outer peripheral frame 510.

The fuse box 500 including the outer peripheral frame 510 and the cover 520 may include an injection material for designing insulation, and the outer peripheral frame 510 of the fuse box 500 can play a role of fixing the fuse 300 in the inside of the battery pack. In particular, the outer peripheral frame 510 can be fastened to a side plate 160 so that the fuse 300 can be fixed to the side plate 160.

However, if an abnormal condition such as overvoltage, overcurrent or overheating occurs inside the battery pack, there may be a problem that the fuse box 500 including the injection material may melt due to high temperature. Eventually, the fuse 300 inside the fuse box 500 is exposed to the outside and the fuse 300 is not properly fixed, so that the fuse 300 can come into contact with other structures which lead to additional events such as ignition or explosion inside the battery pack.

The battery pack according to the embodiments of the present disclosure has attempted to solve the above problems by including a fixing member 400 having heat resistance in which at least a part is located at the lower end of the fuse 300. The fixing member 400 may include at least one of a ceramic material, a fiberglass, and a plastic material.

Even if the fuse box 500 melts due to occurrence of an abnormal condition such as an overcurrent, the fixing member 400 has heat resistance, so that the fuse 300 in which the fixation is released can be prevented from moving downward.

Finally, the fuse 300 can be prevented from coming into contact with internal structures and the like to thereby prevent additional ignition or explosion of the battery pack.

The fixing member 400 may have a structure that protrudes perpendicularly to the side plate 160. More specifically, the fixing member 400 may be formed by protruding an additional member interposed between the fuse 300 and the side plate 160 as shown in FIG. 4. Further, unlike that, the fixing member can have a structure which is integrally protruded from the side plate 160.

Meanwhile, the outer peripheral frame 510 may include a fixing member frame 511 that wraps the outer peripheral surface of the fixing member 400, and the fixing member frame 511 may be integrated with the outer peripheral frame 510.

The fuse box 500 can be stably disposed on the fixing member 400 via the fixing member frame 511. Usually, in a normal operating environment, flow or separation of the fuse box 500 caused by an external shock or the like can be minimized.

Meanwhile, the fuse 300 may be fastened to each of the first bus bar 210 and the second bus bar 220 by a bolt 330 in the fuse box 500.

Referring back to FIGS. 2 and 3, the first bus bar 210 may be configured so as to become upward as it goes toward the first battery module 110, and the second bus bar 220 may be configured so as to become downward as it goes toward the second battery module 120. More specifically, the first bus bar 210 may be configured so as to become downward as it goes toward the portion connected with the first battery module 110, and the second bus bar 220 may be configured so as to become downward as it goes toward the portion connected with the second battery module 120.

As described above, since the first battery module 110 may be located at the upper layer than the second battery module 120, the first bus bar 210 and the second bus bar 220 connected with each of them may form a constant angle, such as upward or downward. When the fuse box 500 melts due to high temperature, the first bus bar 210 and the second bus bar 220, which forms a constant angle in this way, may further induce a downward movement or irregular flow of the fuse 300 in which the fixation is released.

Therefore, when the fixing member 400 is provided with the fuse 300 that is connected with the bus bars 210 and 220 configured to form a certain angle, the effect of improving safety can be further maximized.

Figure 5:
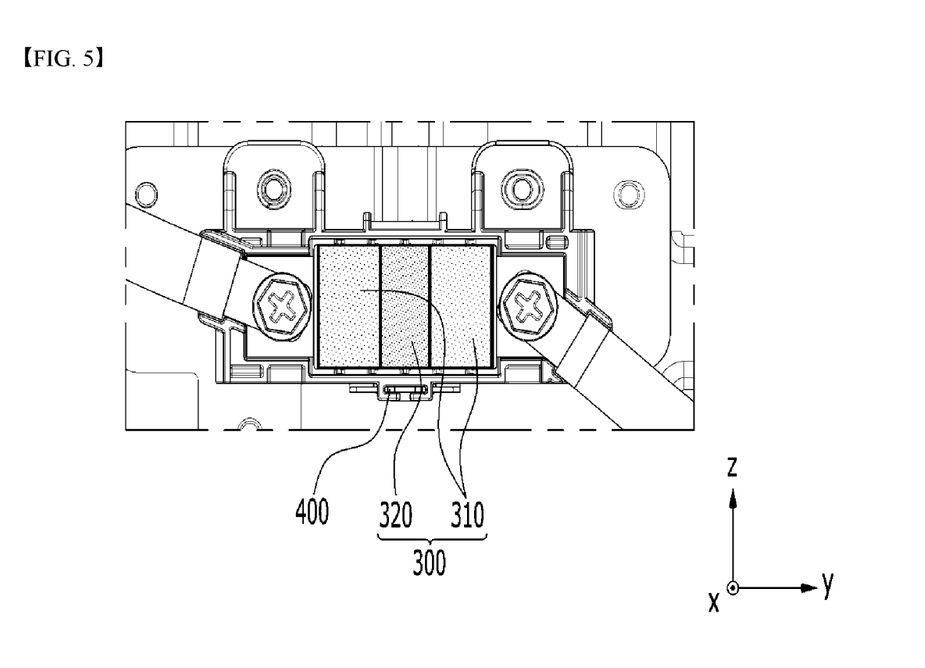
FIG. 5 is a front view of the fuse of FIG. 4 as viewed from a direction opposite to the x-axis.

FIG. 5 is a front view of the fuse of FIG. 4 as viewed from a direction opposite to the x-axis. More specifically, FIG. 5 is a view showing the inside of the fuse 300 as a projection.

Referring to FIG. 5, the fuse 300 includes a non-conductive part 320 having an electrical insulation, and the fixing member 400 may be located at a lower end part of the non-conductive part 320. In addition, the fuse 300 may further include a conductive parts 310 having no electrical insulation, and the non-conductive part 320 may be located between the conductive parts 310. However, the positions of the conductive part 310 and the non-conductive part 320 are one exemplary configuration, and embodiments of the present disclosure are not limited thereto.

In the present disclosure, it is possible to prevent a structural short circuit from occurring when the fixing member 400 supports the lower end part of the fuse 300. In other words, even if the fuse box 500 melts in an abnormal condition such as overcurrent and the fuse 300 comes into contact with the fixing member 400, the fixing member 400 comes into contact with the lower end part of the non-conductive part 320, thereby reducing the possibility of occurrence of an additional short circuit.

In addition, since the non-conductive part 320 and the conductive part 310, both of which have no electrical insulation, are provided so that the fixing member 400 can also be applied to the product of the fuse 300 in which only a part has an insulation property, cost reduction can be expected.

Figure 6:
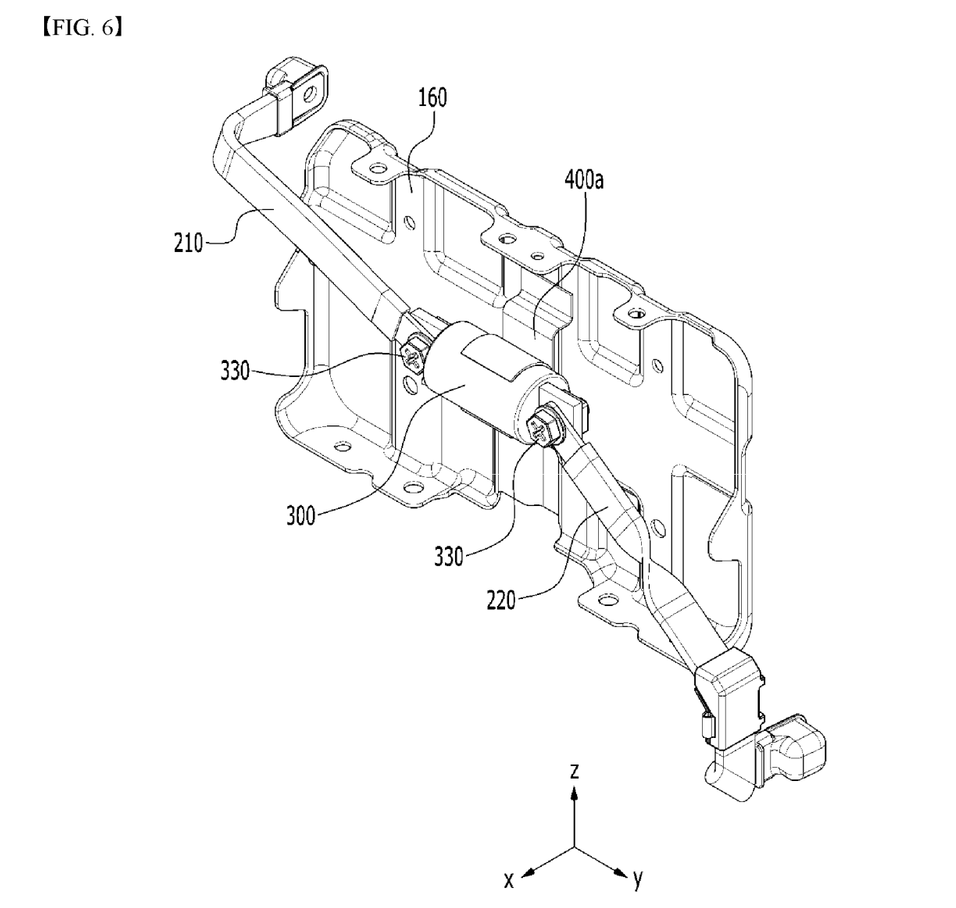
FIG. 6 is a perspective view showing a fixing member, a fuse, a first bus bar, a second bus bar, and a side plate.
Figure 7:
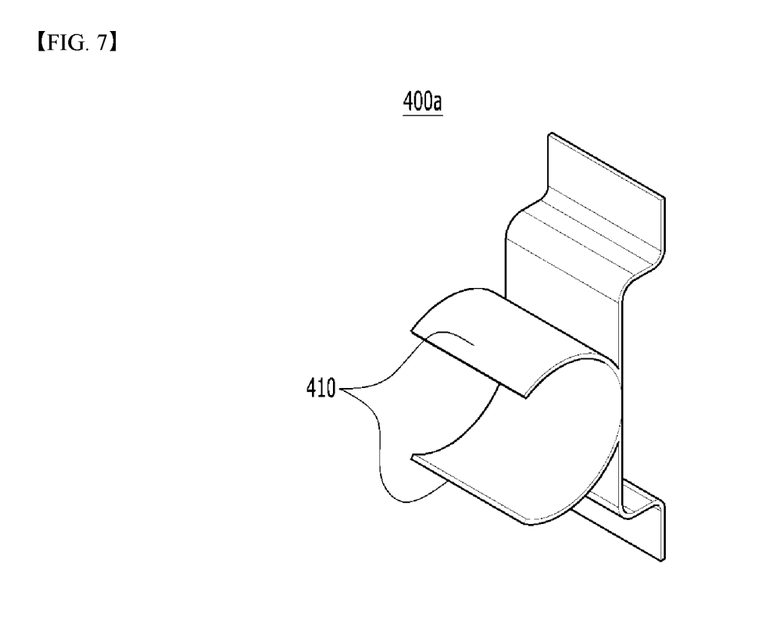
FIG. 7 is a perspective view showing the fixing member of FIG. 6.

FIG. 6 is a perspective view showing a fixing member 400a, a fuse 300, a first bus bar 210, a second bus bar 220, and a side plate 160 as a modified embodiment of the present disclosure. For convenience of explanation, illustration of other configurations is omitted. FIG. 7 is a perspective view of the fixing member 400a of FIG. 6.

Referring to FIGS. 6 and 7, the fixing member 400a having heat resistance according to the present embodiment may include a clamp part 410 that wraps at least a part of the outer peripheral surface of the fuse 300, and the clamp part 410 may support the lower end part of the fuse 300.

More specifically, the fixing member 400a may be fixed to the side plate 160 that is located on one side of the first battery module (not shown), and the clamp part 410 may be configured in the shape of supporting the lower end part while wrapping the lower end part, one side part and upper end part of the fuse 300. In this case, the one side part is a side surface in the direction in which the side plate 160 is located, and the other side part facing the one side part may be opened without being wrapped by the clamp part 410.

The fuse 300 may be cylindrical, and the clamp part 410 may also be configured in a circular clamp shape accordingly.

Although not specifically shown, the fuse box described above may accommodate the fuse 300 therein.

Since the fixing member 400a including the clamp part 410 not only supports the lower end part of the fuse 300 but also wraps at least part of the outer peripheral surface, the fuse 300 can be stably fixed to the side plate 160. Not only it prevents the fuse 300 from moving downward in abnormal conditions such as overvoltage, overcurrent, or overheating, but it also enables stable fixing of the fuse (300) in the condition of external shock or vibration.

As described above, the fixing member 400a preferably has heat resistance, and may include at least one of a ceramic material, a fiberglass, and a plastic material. Further, the clamp part 410 may wrap a non-conductive part having an electrical insulation among the fuse 300.

Meanwhile, the side plate 160, the bolt 330, the first bus bar 210 that is configured so as to become upward as it goes toward the first battery module (not shown), and the second bus bar 220 that is configured so as to become downward as it goes toward the second battery module (not shown) may be mutually identical or similar to the configuration described above.

Figure 8:
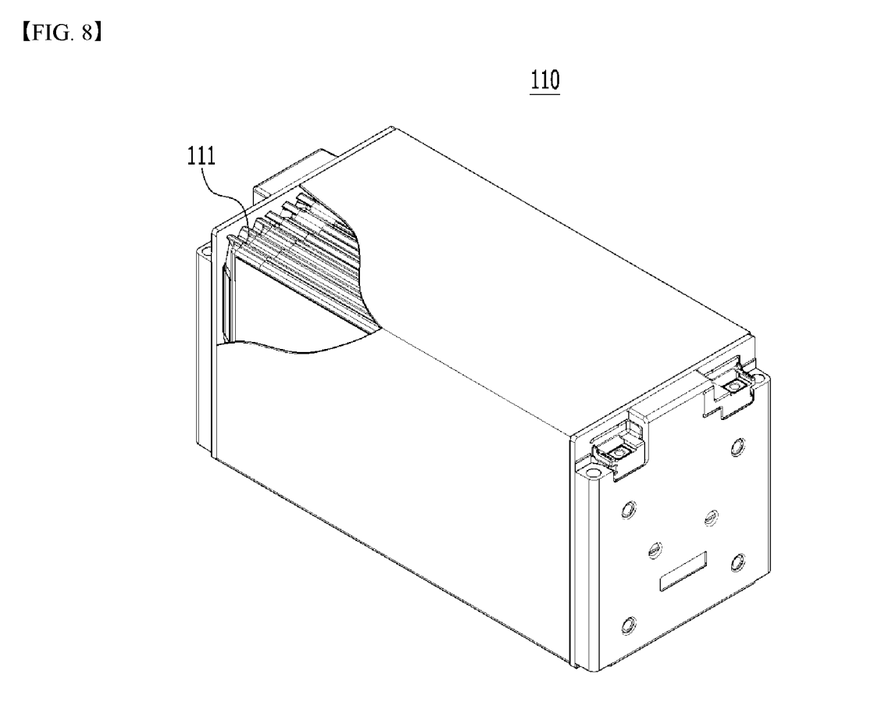
FIG. 8 is a perspective view showing a first battery module included in the battery pack of FIG. 1.

FIG. 8 is a perspective view showing a first battery module 110 included in the battery pack 100 of FIG. 1.

Referring to FIG. 8, the first battery module 110 may include a plurality of battery cells 111. More specifically, the plurality of battery cells 111 are accommodated in the module case after being stacked along a preset direction, thereby configuring the first battery module 110.

Since the types of the plurality of battery cells 111 are not particularly limited, a pouch-type secondary battery or a prismatic-type secondary battery can be used, but the pouch-type secondary battery is preferred.

Meanwhile, since the first battery module 110 has been described as an example for the battery module in the present disclosure, other battery modules including the second battery module 120 in FIG. 1 may have a structure mutually identical or similar to the first battery module 110 described in FIG. 8.

One or more battery packs according to the present embodiment described above can be applied to various devices. These devices may be applied to transportation means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery pack
110: first battery module
120: second battery module
150: horizontal plate
160: side plate
210: first bus bar
220: second bus bar
300: fuse
400: fixing member
500: fuse box
510: outer peripheral frame
520: cover

The invention claimed is:

1. A battery pack comprising:
a first battery module and a second battery module, each battery module including a plurality of battery cells;
a first bus bar extended from the first battery module and a second bus bar extended from the second battery module;
a fuse connecting the first bus bar and the second bus bar;
a fixing member having heat resistance in which at least a part of the fixing member is located at a lower end part of the fuse;
a fuse box for accommodating the fuse; and
a side plate on a side of the first battery module,
wherein a lowermost part of the first battery module is located higher than an uppermost part of the second battery module,
wherein the first bus bar is configured so as to go upward as it goes toward the first battery module, and the second bus bar is configured so as to go downward as it goes toward the second battery module,
wherein the fuse is attached to the side plate,
wherein the fixing member protrudes from the side plate,
wherein the fuse box is attached to the fixing member,
wherein the fuse box includes an outer peripheral frame connected to the side plate, and
wherein the outer peripheral frame surrounds the fuse.

2. The battery pack according to claim 1, wherein the fuse includes a non-conductive part having an electrical insulation, and
wherein the fixing member is located under the non-conductive part.

3. The battery pack according to claim 1, wherein the first battery module and the second battery module form a layered structure.

4. The battery pack according to claim 1, wherein the fixing member includes at least one of a ceramic material, a fiberglass, and a plastic material.

5. The battery pack according to claim 1,
wherein the outer peripheral frame wraps the fuse and has one open side, and the fuse box further comprises a cover that covers the one open side of the outer peripheral frame.

6. The battery pack according to claim 5, wherein the outer peripheral frame includes a fixing member frame for wrapping an outer peripheral surface of the fixing member.

7. The battery pack according to claim 6, wherein the fixing member frame is integrally formed with the outer peripheral frame.

8. The battery pack according to claim 5, wherein the fuse box includes an injection material.

9. The battery pack according to claim 1, wherein the fuse box further includes a cover, the cover attaching to the outer peripheral frame and covering the fuse, and
wherein the fuse is between the outer peripheral frame and the cover.

10. The battery pack according to claim 1, wherein the fixing member protrudes perpendicularly from the side plate.

11. The battery pack according to claim 1, wherein the fuse box has a slot that surrounds the fixing member.

12. The battery pack according to claim 11, wherein the fuse box includes a cover covering the fuse, and
wherein the slot is in the outer peripheral member.

13. A device comprising one or more battery packs as set forth in claim 1.

\* \* \* \* \*